July 13, 1954
H. J. NICHOLLS
2,683,689
APPARATUS FOR TREATING GRANULAR MATERIAL
THROUGH ACTION OF ELECTROSTATIC CORONA
Filed March 28, 1949
2 Sheets-Sheet 1
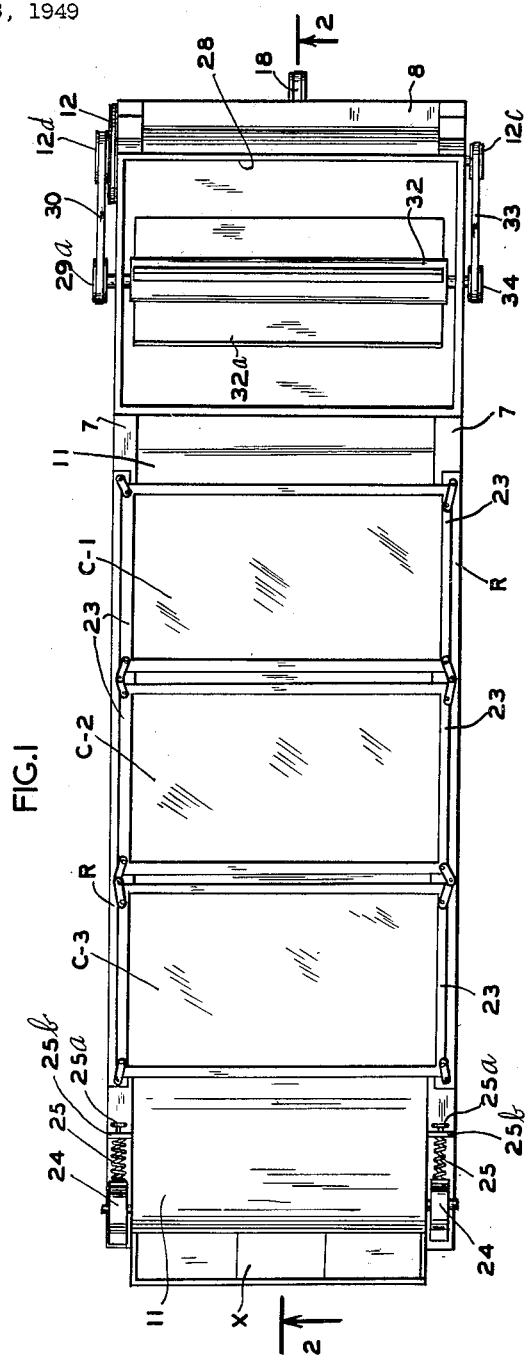
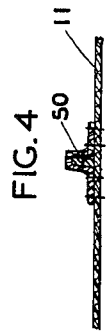
*INVENTOR.*
HENRY J. NICHOLLS
BY *Williamson + Williamson*
ATTORNEYS

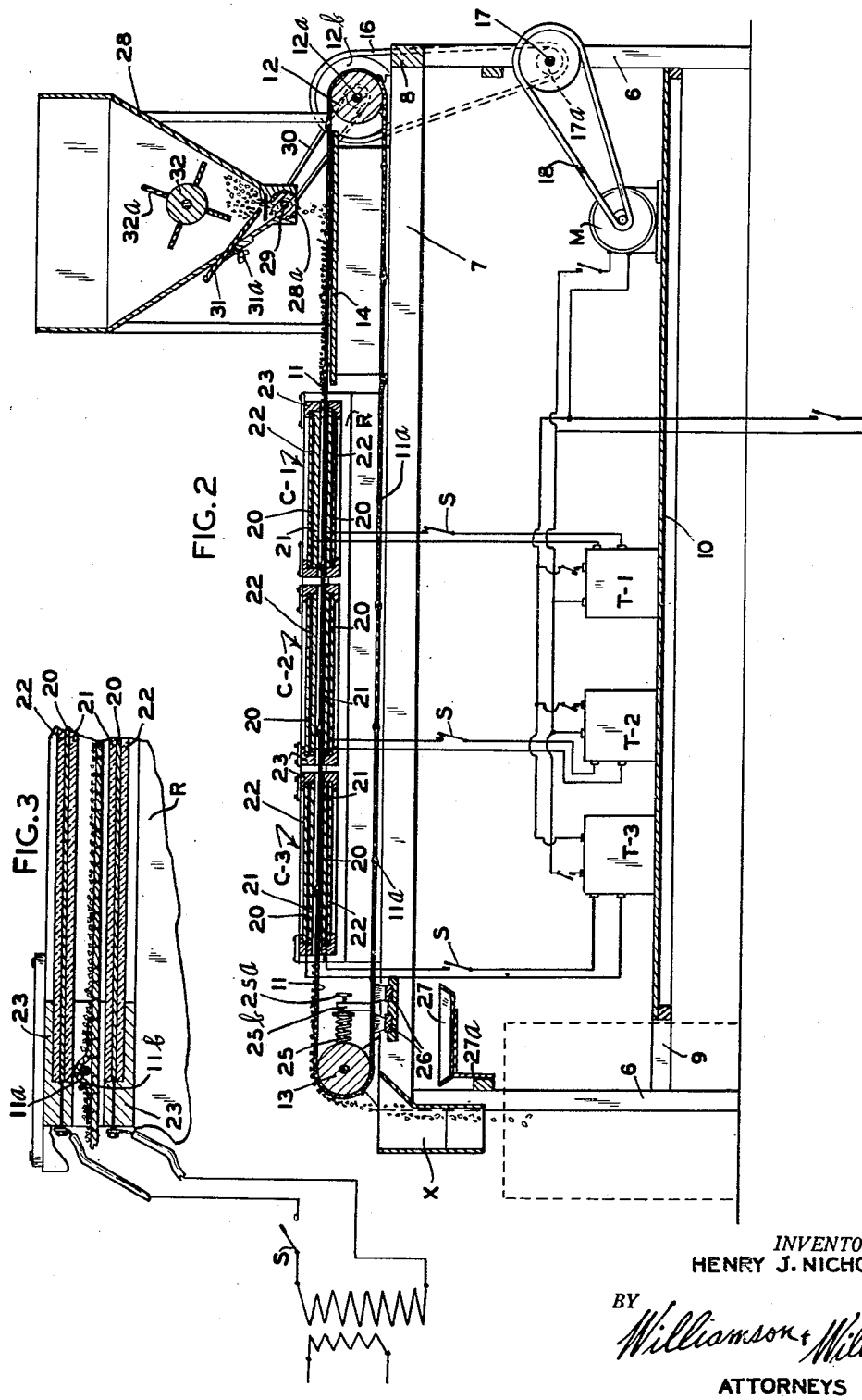

Patented July 13, 1954

2,683,689

UNITED STATES PATENT OFFICE 2,683,689

APPARATUS FOR TREATING GRANULAR MATERIAL THROUGH ACTION OF ELECTROSTATIC CORONA

Henry J. Nicholls, Minneapolis, Minn.

Application March 28, 1949, Serial No. 83,802

1 Claim. (Cl. 204—313)

This invention relates to apparatus and an improved method for treating granular and solid materials with ultraviolet rays and ozone produced through the phenomenon of electrostatic corona.

Science recognizes today that ultraviolet rays and other light rays having characteristics in a spectroscope close to ultraviolet are efficient for purifying, preventing or restricting organic proliferation and checking or preventing rancidity.

It is also recognized that ozone has beneficial results in purifying material and also in preventing organic proliferation.

This invention is an improvement in certain respects upon the subject matter of my United States Letters Patent Number 2,070,307, granted February 9, 1937. Extensive research in various fields and industries including treatment in production of granular food products, soaps, tobacco, and numerous chemicals has brought about my discovery of improved apparatus and a new and improved method for utilizing the phenomenon of electrostatic corona for highly efficient treatment of granules or solid particles or lumps of material passed or moved along a more or less horizontal path through the corona produced.

It is an object of my present invention to provide simple and efficient apparatus for continuously treating granular, flaky, or solid particle products to subject the same according to the requirements and within a substantial range of intensity and time of treatment to the simultaneous action of ultraviolet rays and nascent ozone.

A further object is the provision of apparatus of the class described wherein an efficient electrostatic corona may be produced between a pair of substantially horizontally disposed spaced condenser grids and wherein granular or flaky material is caused to pass substantially in horizontal travel between said grids in continuous or intermittent movement with the unexpected result that the particles are charged when subjected to the phenomenon and stand on end during treatment thereby individually being subjected to a thorough treatment from the rays and ozone produced.

Another object is the provision of an improved method particularly well adapted for commercial utilization to continuously treat flaky material and solid particles by moving a continuously produced thin layer of the same along a substantially horizontal path through the corona which is productive of both ultraviolet rays and ozone.

The use of my apparatus and method has produced unexpected results in the treatment of various plant and food products to prevent rancidity and subsequent development of bitter taste characteristics and while capable of use on manifold products, is particularly well adapted to purify, de-bitterize, and prevent rancidity in commercially produced wheat germ.

The foregoing and other objects and advantages of the invention will be more fully set forth in the following description made in connection with the accompanying drawings, in which like reference characters refer to similar parts throughout the several views and in which:

Fig. 1 is a plan view showing an embodiment of my apparatus;

Fig. 2 is a central vertical section taken longitudinally of the machine along the line 2—2 of Fig. 1;

Fig. 3 is a fragmentary vertical section on a larger scale showing a portion of one set of grid condenser units with electrical connections in diagram; and Fig. 4 is a fragmentary vertical section on a larger scale showing a portion of a modified form of conveyor belt with a flap type rib and wiper element connected therewith.

The machine or embodiment of my invention illustrated is adapted to selectively treat for varying intensity of treatment a thin layer of granular or flaky particles deposited and spread continuously upon a substantially horizontal conveyor. As shown, the working mechanisms of my machine are mounted upon a table frame having the four supporting legs 6 interconnected and reinforced at their upper ends by longitudinal stringer members 7 and end cross frame members 8. The legs are further interconnected adjacent their lower ends by a pair of elongated side members 9 upon which is mounted a horizontal supporting shelf 10.

A substantially horizontal endless conveyor as shown of the flexible apron type, is mounted on the top of the supporting frame comprising an endless flexible apron 11 trained about a transverse rear conveyor roller 12 and a forward conveyor roller 13. The apron or belt 11 may be constructed of any suitable relatively non-stretchable fabric or flexible foraminated material, and I prefer to utilize a material having reflective characteristics. White Osnaburg is found among other materials to be very satisfactory for the purposes intended. At the receiving end of the conveyor a flat deck 14 is preferably employed for simultaneously supporting that portion of the conveyor. Conveyor apron 11 is preferably constructed of white Osnaburg or other flexible material which may be penetrated by ultra violet rays and which is sufficiently porous to permit circulation of a gaseous medium such as ozone and air therethrough. Conveyor apron 11, as shown, is driven from the rear roller 12, although in many installations it is preferable to drive the front roller. As shown, the rear roller shaft 12a has affixed at one end thereof a relatively large V-belt pulley 12b which is driven by an endless V-belt 16 from the small pulley 17a affixed to one end of a countershaft 17 which is in turn driven by an electric motor M mounted on the supporting shelf 10 at the bottom and adjacent the rear portion of the frame. As shown, the motor through a V-belt 18 drives shaft 17 at one end thereof.

In the travel of the upper leaf of apron 11, the material carried thereby is subjected to the ultraviolet and other rays produced as well as ozone produced through an electrostatic corona. As shown, I provide three pairs of cooperating condenser grids designated as entireties by the reference characters C-1, C-2, and C-3. The condenser units are substantially identical in structure, although if desired, the successive pairs of units may have grid surfaces of varying area. As shown, each condenser unit comprises a relatively thin metallic grid 20 of foraminous construction bonded or otherwise secured to a flat sheet 21 of dielectric and preferably transparent material. Certain of the glasses which will transmit ultraviolet rays or quartz sheets are preferred, although any transparent or translucent dielectric material which will transmit a substantial proportion of ultraviolet rays is satisfactory. The grids 20 are preferably covered on their outer or non-opposing surfaces with thin layers or sheets of dielectric material 22.

As shown, each grid unit has the elements thereof bonded or otherwise secured together in the form of a compact plate. A pair of cooperating upper and lower grid units is provided for each successive treatment as shown being housed and removably secured within rectangular frames 23 which may be attached between a pair of longitudinally extending vertical side rails R affixed to the longitudinal top stringer member 7 of the supporting frame.

The opposing faces of the dielectric grid-covering elements 21 of two cooperating condenser units are spaced apart in parallel relation a slight distance varying from ⅛ inch to ½ inch, depending upon the fineness of the material to be treated and the thickness of apron 11. The lower grid unit of each cooperating pair (C-1, C-2, and C-3) forms a supporting deck for the conveyor apron 11, and the upper surfaces of the dielectric sheets 21 of said lower units lie substantially in a common plane and in the same plane with the upper surface of the deck 14.

For the purpose of wiping and cleaning the bottom surfaces of the upper grid units of each pair and to also prevent weaving or bunching of the fabric material of conveyor apron 11, I prefer to provide the conveyor apron with a multiplicity of transverse spaced rigid rods 11a secured to the outer surface of the apron by suitable means such as strips of fabric material 11b, said rods forming transverse spaced ridges in the conveyor of a height of thickness to lightly wipe and engage the lower surface of the upper condenser grids, as shown in Fig. 3, during operation. In Fig. 4 a somewhat different form of reinforcing and wiping element is illustrated comprising a series of spaced rigid rods 50 of oblong cross section secured to the outer surface of the conveyor apron 11 by flexible strips which have their longitudinal edges secured in hem fashion to the apron. The rods 50 are disposed normally edgewise to the conveyor apron and may swing or tilt in action to produce an efficient wiping as they pass in travel of the conveyor through the horizontal passages defined by the cooperating series of grid units.

As shown, the endless conveyor apron 11 is tensioned by belt tightener mechanism connected with the rear roller 13. As shown, this mechanism for each end of the roller comprises a suitable horizontally split bearing 24 slidably mounted upon the longitudinal stringer member 7 of the frame and urged outwardly in each instance by a coiled spring 25 which is interposed between an abutment element 25a threadedly connected with an upstanding supporting bracket 25b.

If desired, a pair of transversely disposed scraper brushes 26 are mounted below the delivery end of a conveyor apron 11 adapted to scrape against the underleaf of the apron to remove dust and small particles of flaky or granular material remaining. The material scraped off may drop into a collection pan 27 supported from a bracket 27a below the brushes.

My apparatus, as shown, includes continuously operated feeding mechanism for uniformly distributing upon the receiving portion of the endless conveyor a thin film or stratum of granular or flaky material. As shown, this feeding mechanism comprises a large hopper 28 tapering downwardly to its lower delivery end and terminating in a discharge passage 28a disposed transversely of the conveyor apron 11 and extending substantially above the full width thereof. A rotary feed roller 29 is suitably journaled in the discharge 28a of the hopper, as shown being of the conventional type employing a longitudinally corrugated roll wherein the groove portions receive and measure and dispense quantities of granular or flaky material at a desired rate of speed in accordance with the R. P. M. at which the feed roller is driven. Feed roller 29 is driven from one end thereof by a V-belt 30 which is trained about a suitable pulley 29a and a driving pulley 12d affixed to the adjacent end of the roller shaft 12a. An adjustable feed gate 31 is slidably mounted as shown in the rear wall of hopper 28 with its lower edge in a position overhanging the lower portion of the hopper and adjustable therein by sliding action. A wing clamping nut 31a is provided for retaining gate 31 in a desired adjusted position. My feeding mechanism, as shown, also includes a rotary agitator 32 in the form of a paddle wheel comprising a hub roller and a series of relatively narrow radial blades 32a affixed thereto. This agitator is driven as shown by an endless V-belt 33 which is trained about a driven pulley 34 affixed to one of the ends of the shaft of agitator 32. The V-belt also is trained about a driving pulley 12c fixed to the end of roller shaft 12a opposite from the affixation of the pulley 12b.

As shown, the several pairs of cooperating condenser grid units, C-1, C-2, and C-3, are adapted to be selectively operated in any sequence or combination desired. Thus, each unit comprising the two cooperating upper and lower grids is connected, as shown in diagram, in a separate electrical circuit employing a control switch S and a separate transformer. The transformers for the three units are as entireties indicated by the reference characters T-1, T-2 and T-3. The two grids 20 of each unit are connected in an electrical circuit as diagrammed in Figs. 2 and 3 with the respective transformer which is in turn connected with a conventional source of alternating current. The transformers are so designed as to obtain the desired potential and frequency in a manner well known to those skilled in the art for the production of the phenomenon, electrostatic corona. Each of the circuits is provided, as shown, with a control switch S.

If the air between the two opposed and spaced grids 20 is adequately dry and the potential and frequency are proper, the discharge of electricity will be substantially silent and there will be practically no discharge of sparks or disruptive discharge, but a purple glow is produced between the two units. The light generated contains a very high proportion of ultraviolet rays. Relatively large amounts of ozone are produced between the grids. Production of ozone by such phenomenon or condenser structure is known in the art.

In operation solid particles such as granules, flakes, or flocculent materials or fibers are suitably distributed upon the receiving end of the conveyor apron 11, it being desirable to control the feeding and distribution to cover substantially the full width of the apron with a relatively thin coating. This is continuously effected while the machine is in operation. The endless conveyor 11 moves the material through the shallow passages between the several pairs of grid units, the material moving through approximately the center of the corona produced.

As the material moves through the respective pairs of grids, it is electrically charged and the particles are caused to stand on end in erect position on the supporting apron. This exposes a very large proportion of their overall exterior end surface area and with the production of ultraviolet rays emanating in an infinite number of directions in an atmosphere completely surrounding the particles gives a very thorough and efficient treatment of the particles from the rays produced as well as the ozone produced in the corona action. The apron 11 continues to move the particles through the entire shallow treating chambers, and they are then dumped or scraped from the delivery end of the machine passing, as shown, down a delivery chute X where they may be sacked or dispensed in containers.

It will, of course, be understood that according to the intensity and duration of treatment required, one or more of the electrical circuits may be closed to bring into operation selectively one or more of the condenser units.

In operation the rods 11a with the thickness of the covering strips 11b brush against the undersurfaces of the dielectric sheets or panels 21 of the units while the apron itself brushes against and is supported by the upper dielectric sheet of the lower grid unit of each pair. Thus these preferably transparent and dielectric plates are kept clear of accumulation of dust or foreign material which would otherwise accumulate.

Extensive use of the apparatus for food and vitamin materials such as wheat germ; for treatment of tobacco, soap, and flocculent materials has provided highly efficient results where ultraviolet ray and ozone treatment is desired.

From the foregoing description it will be seen that in addition to providing simple and highly efficient apparatus for treating particles of flocculent material with the light rays and gaseous products produced from electrostatic corona, I have provided a simple and highly efficient process of treatment which combines the steps as described and which results in very thoroughly and efficiently treating by continuous process particles or other solids with the rays emanated and the ozone produced.

It will, of course, be understood that various changes may be made in the form, details, arrangement and proportions of the parts without departing from the scope of my invention.

What I claim is:

Apparatus for treating divided and granular solid materials with light rays and gases evolved through electrostatic corona, having in combination a pair of closely spaced, substantially parallel condenser units disposed generally horizontally, each unit comprising at least one metallic grid of substantial area and a smooth, flat covering of dielectric material, the respective grids of said units being opposed and said smooth dielectric coverings being opposed to define and form a continuous, very shallow, generally horizontal passage, means for connecting said grids in an electric transformer circuit to set up electrostatic corona in said passage, an endless conveyor comprising a flexible apron constructed of material permeable to light and foraminous to an extent of permitting passage of gases therethrough, said apron being supported throughout a portion of one of its runs upon the dielectric covering of the lower condenser unit to maintain said apron smoothly in planar relationship and further, having wiping contact with said lower dielectric covering to keep the same clear of dust, the said apron on the side thereof opposing the upper condenser unit having a series of spaced, transverse wiper elements projecting from said surface and engaging the lower surface of said upper dielectric covering with wiping contact to keep the same clear of dust during operation of said apparatus, and means for driving said conveyor.

References Cited in the file of this patent

UNITED STATES PATENTS

| Number | Name | Date |
| --- | --- | --- |
| 743,431 | Blackmarr et al. | Nov. 10, 1903 |
| 906,468 | Steynis | Dec. 8, 1908 |
| 1,016,790 | Smith | Feb. 6, 1912 |
| 1,437,760 | Kuhlenschmidt | Dec. 5, 1922 |
| 1,505,750 | Todd | Aug. 19, 1924 |
| 1,588,976 | McBlain | June 15, 1926 |
| 1,757,477 | Rosenhoch | May 6, 1930 |
| 1,793,799 | Hartman | Feb. 24, 1931 |
| 1,965,187 | Hartman | July 3, 1934 |
| 1,965,609 | Smith | July 10, 1934 |
| 2,070,307 | Nicholls | Feb. 9, 1937 |
| 2,254,016 | Melton et al. | Aug. 26, 1941 |
| 2,500,728 | Williams | Mar. 14, 1950 |